A. F. DICKEY.
GEARING.
APPLICATION FILED MAY 31, 1917.

1,268,693. Patented June 4, 1918.
3 SHEETS—SHEET 1.

Inventor,
Aaron F. Dickey,
By Hull, Smith, Brock & West
Attorneys

A. F. DICKEY.
GEARING.
APPLICATION FILED MAY 31, 1917.

1,268,693.

Patented June 4, 1918.
3 SHEETS—SHEET 2.

Inventor,
Aaron F. Dickey
By Hull, Smith, Brock & West
Attorneys.

A. F. DICKEY.
GEARING.
APPLICATION FILED MAY 31, 1917.
1,268,693.
Patented June 4, 1918.
3 SHEETS—SHEET 3.
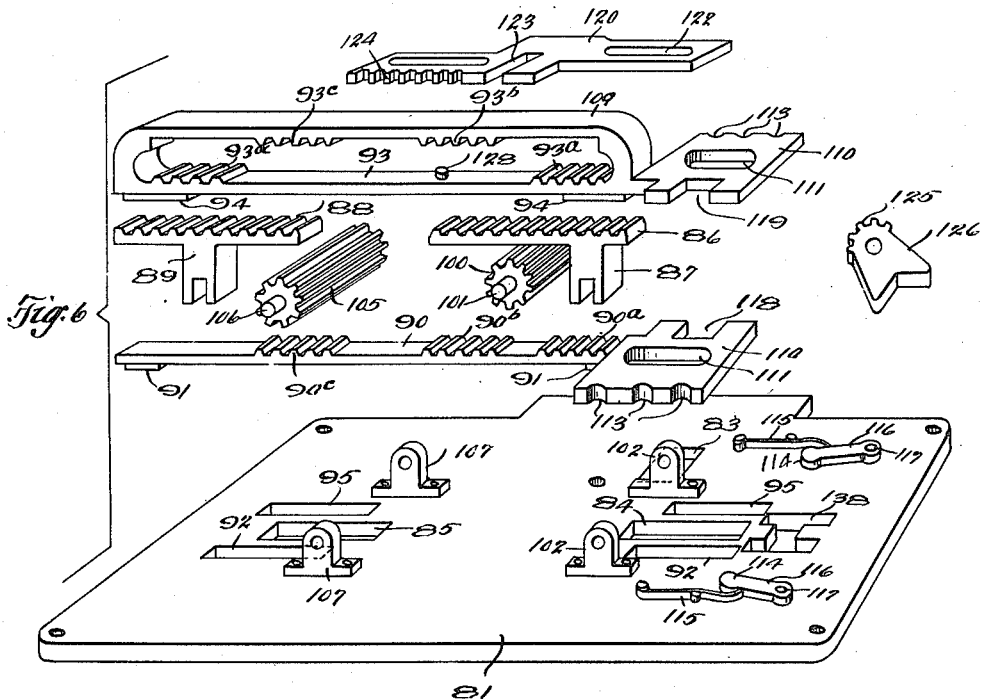
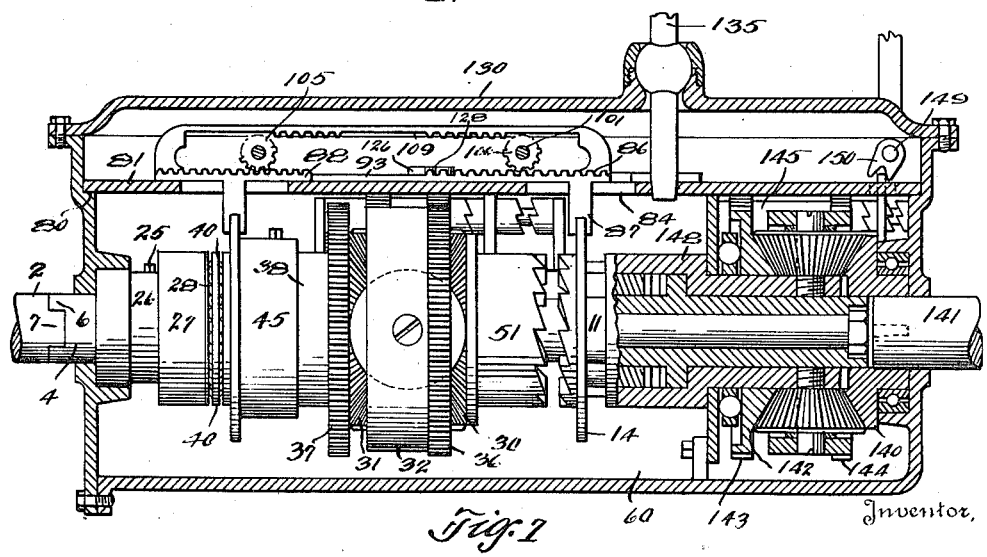
Inventor,
Aaron F. Dickey
By Hull, Smith, Brock & West
Attorneys.

UNITED STATES PATENT OFFICE.

AARON F. DICKEY, OF SOMERSET, PENNSYLVANIA.

GEARING.

1,268,693.  Specification of Letters Patent.  Patented June 4, 1918.

Application filed May 31, 1917. Serial No. 171,863.

*To all whom it may concern:*

Be it known that I, AARON F. DICKEY, a citizen of the United States, residing at Somerset, in the county of Somerset and State of Pennsylvania, have invented a certain new and useful Improvement in Gearing, of which the following is a full, clear, and exact description, reference being had to the accompanying drawings.

This invention relates to improvements in transmission gearing, the present embodiment being especially adapted for use in automobile constructions; and it has for its general objects the attainment of strength, durability, compactness, ease of actuation, ease of adjustment to compensate for wear, and positiveness and smoothness of operation in the changing of the gear ratios as well as in driving.

A further object of the invention is the production of a self-contained transmission gearing which may be transported in assembled condition and conveniently installed without the need of dismantling the same.

To these ends my improved transmission gearing is embodied in a construction designed to be built around a main shaft—which may constitute the driven shaft, or an extension adapted to be applied or secured thereto; wherein the various gears are constantly in mesh and are rendered active or inactive through the intervention of clutches; and including means for automatically executing certain clutch combinations in the attainment of given gear ratios.

It is apparent from the foregoing, and will become more evident as this description proceeds, that the undesirable features of prevailing types of transmission gearing are entirely eliminated in my improved gearing—such, for instance, as the clatter and vibration usually incident to the meshing of the gears; and the stripping of the gears by reason of a partial normal engagement while positively driving.

While I have shown and shall proceed to describe in detail a very desirable embodiment of my invention, it will be understood that I do not limit myself to the exact construction herein illustrated further than is required by the terms of the annexed claims.

Figure 1:
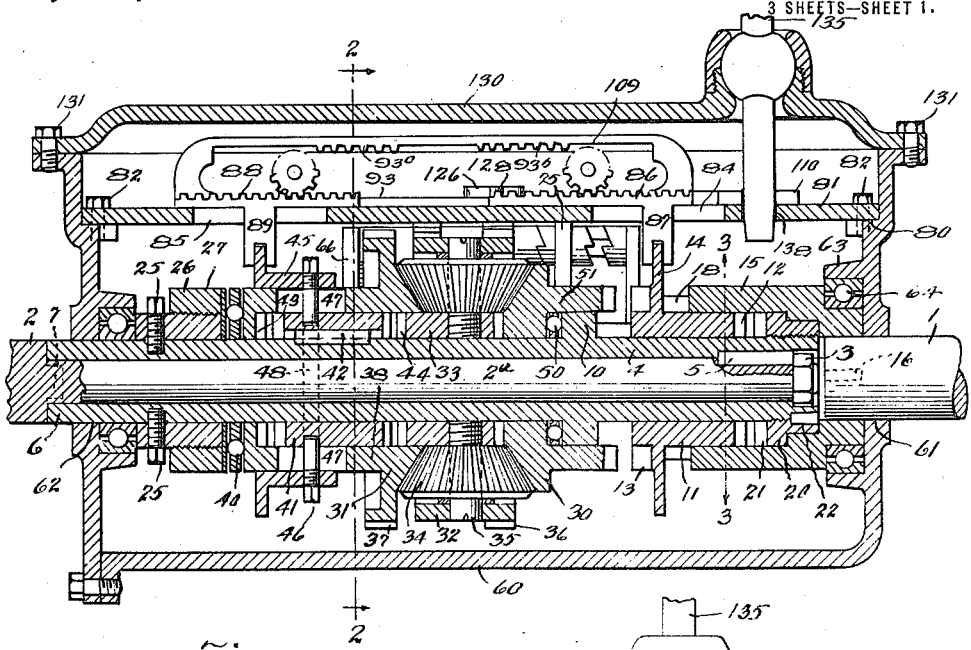
Figure 2:
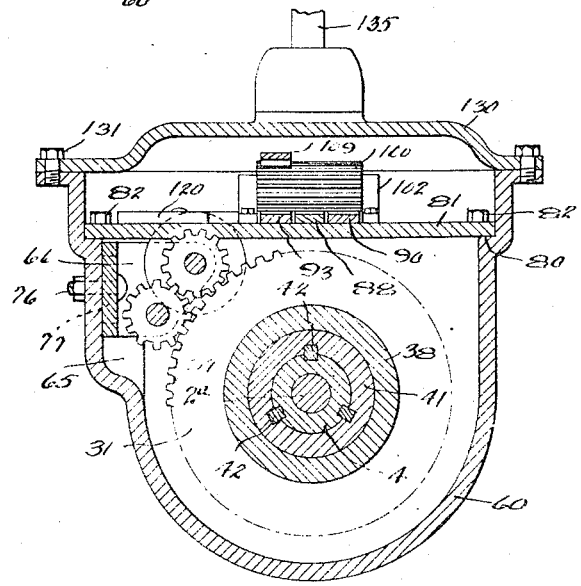
Figure 3:
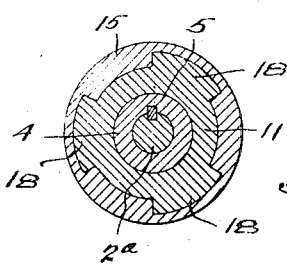
Figure 4:
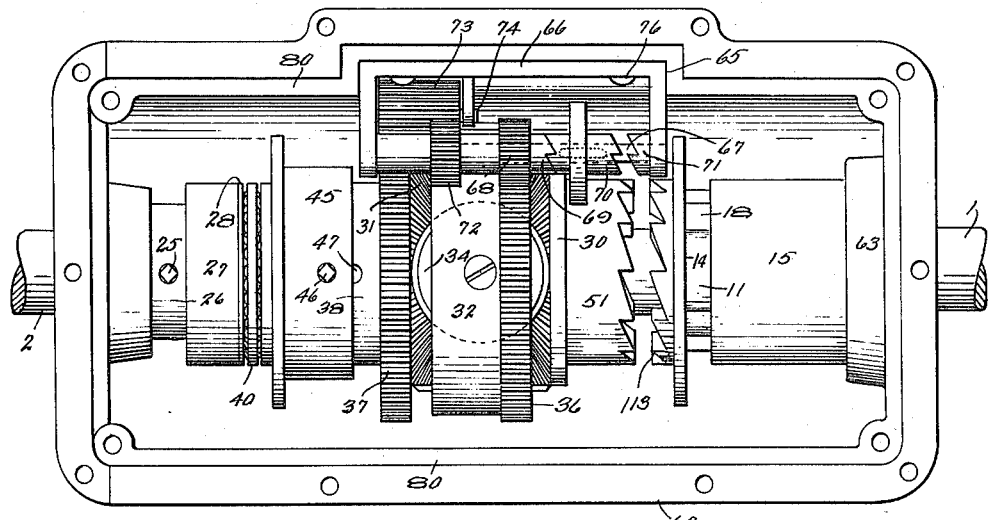
Figure 5:
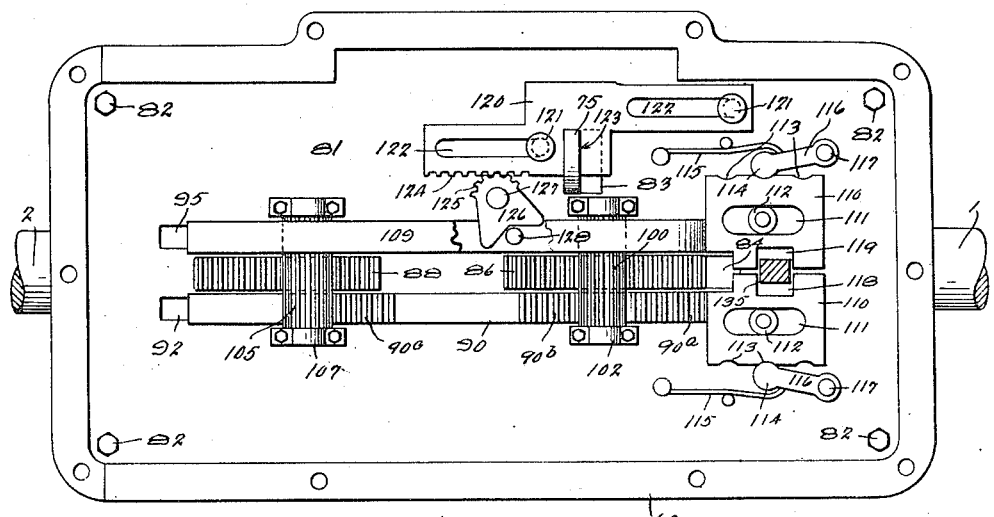

In the drawings, Figure 1 is a vertical longitudinal section through my improved transmission gearing; Fig. 2 is a transverse section on the line 2—2 of Fig. 1; Fig. 3, a sectional detail on the line 3—3 of Fig. 1; Fig. 4 is a plan view with the cover and the plate which carries the shifting racks, etc., removed; Fig. 5 is a similar view including said plate; Fig. 6 is a perspective view of the shifting racks, pinions, slides and supporting plate in separated condition; and Fig. 7 is a view, similar to Fig. 1, of a modification.

Referring to the corresponding parts throughout the several views of the drawings by the use of like reference characters, 1 represents the driving shaft, which in the present instance may be the main shaft of an automobile engine, and 2 the driven shaft. The latter is shown as having its forward portion 2$^a$ reduced in diameter and its front end threaded for the application of a nut 3 which holds a sleeve 4 against withdrawal from the reduced portion of the shaft. The sleeve is recessed at its forward end for the accommodation of the nut 3, and is held against turning upon the reduced portion 2$^a$ by means of a key 5, and also, if preferred, by having its rear end provided with projections 6 which interlock with corresponding projections 7 of the shaft. For all practical purposes the sleeve 4 may be regarded as a part of the driven shaft for it is obvious that the same might constitute an integral part thereof or be connected to it in any well known manner, and, accordingly, it will be referred to as the driven element.

Forward of its longitudinal center the driven element 4 is provided with a circumferential flange 10, and forward of this flange a clutch member 11 is slidably mounted upon the driven element. This clutch member has a clutch face 12 at its forward end and clutch face 13 at its rear end, and adjacent the last mentioned clutch face is provided with a flange 14. The forward end of the clutch element 11 projects into a recess in a driving head 15 that is secured against rotation, as by key 16, upon the rear end of the driving shaft or element 1. The clutch member 11 is effectively held against turning with respect to the driving head by radial ribs 18, preferably formed integral with the clutch member, and which fit corresponding grooves in the wall of the driving head (see Fig. 3).

A clutch ring 20 is threaded upon the forward end of the driven element and has a clutch face 21 for coöperation with the clutch face 12 of the member 11. A key 22 serves to hold the clutch ring against turning with respect to the driven element.

Mounted upon the left hand end of sleeve 4 (as viewed in Fig. 1) and secured thereto by set screws 25, is a collar 26, externally threaded at its forward end for the application of an adjusting ring 27 which is adapted to bear against the edge portion of an annulus 28. Between the annulus 28 and the flange 10 of the driven element is located a planetary gear mechanism comprising opposed bevel gears 30 and 31 between which is positioned an intermediate member 32, the hub 33 of which bears loosely upon the driven element. In suitable openings in the intermediate member are bevel pinions 34 journaled upon radial stub shafts 35, pinions meshing with the opposed bevel gears 30 and 31. A spur gear 36 is formed upon the periphery of the intermediate member, and a like gear 37 is carried by the bevel gear 31. The bevel gear 31 has an elongated hub 38 which extends rearwardly to a point slightly forward of the annulus 28 and between which and the annulus is located a thrust bearing 40. Except at its extreme rear end, the hub 38 is of ample internal diameter to accommodate between it and the driven element a clutch member 41 having a clutch face at each end, and splined to the driven element through the feathers 42. The hub of the bevel gear 31 is provided with a clutch face 43 for coöperation with the adjacent face of the clutch member 41, and the forward face of said member is adapted to coöperate with a clutch face 44 formed on the rear end of the hub 33 of the intermediate member 32. A shifting collar 45 surrounds the hub 38 and carries set screws 46 which project through slots 47 in the hub and into a circumferential groove 48 in the clutch member 41. It is evident from this construction that the clutch member 41 may be moved into engagement with either of the clutch faces 43 or 44 through the shifting collar 45. A thrust bearing 50 is situated between the flange 10 of the driven element and the inner portion of the hub 51 of the bevel gear 30 where it bears upon the driven element. From the foregoing construction it will be seen that an adjustment may be readily made through the adjusting ring 27 to take up wear occurring in the elements of the planetary gearing.

A casing 60 incloses the mechanism and has an aperture 61 at its forward end for the entrance of the driving shaft or element 1, and at its rear end is provided with an opening 62 through which the rear end of the sleeve 4 projects. Surrounding the opening 61 is an inwardly projecting hollow boss 63 containing a bearing 64 within which fits the reduced forward end of the driving head 15.

One side of the casing has an offset 65 which accommodates a frame 66 in the end walls of which are journaled the ends of a shaft 67 (see Fig. 4). A pinion 68 is loosely mounted upon the shaft 67 and constantly meshes with the spur gear 36. The pinion is provided with a clutch face 69 that is adapted to be engaged by one of the faces of the double clutch 70 that is splined to the shaft 67, wherefore the pinion may be coupled to the shaft. The opposite end of the clutch member is arranged to be engaged with a stationary clutch face 71 that is carried by the adjacent end wall of the casing 66. It follows from this that when the clutch member 70 is shifted into engagement with the stationary clutch face 71, the pinion 68 is liberated from the shaft 67, while the shaft is securely held against turning in one direction. A pinion 72 is fast upon the shaft 67 and meshes constantly with the forward portion of an elongated pinion 73 which is journaled upon a stub shaft 74, supported within the frame 66. The rear portion of the pinion 73 is in constant mesh with the spur gear 37. The clutch member 70 is provided with a flange 75 for coöperation with shifting means presently to be described. The frame 66, as shown, is supported by bolts 76 which extend through holes in the casing and vertical slots 77 in the frame (shown in dotted lines in Fig. 2) so that the frame may be adjusted vertically within the casing to take up any wear which may occur in the gears and pinions.

Just above the plane of the spur gears 36 and 37, the casing has a horizontal ledge 80 which supports a plate 81, the same being shown as held in place by cap screws 82. This plate, (shown in detail in Fig. 5) has a slot 83 upward through which the flange 75 of the clutch member 70 extends. Also, above the flange 14 of the clutch member 11, and above the flange of the shifting collar 45, respectively, and central of the casing, the plate is provided with slots 84 and 85. A rack 86 is adapted to ride upon the plate 81 across the slot 84, and the rack is provided with a depending lug 87 which is bifurcated at its lower end for the reception of the flange 14 of the clutch member 11. A similar rack 88 is located over the slot 85 and the bifurcation of its depending lug 89 receives the flange of the shifting collar 45. A slide 90 is mounted upon the plate 81 along one side of the racks 86 and 88 and has projections 91 which reciprocate within the guide slots 92 of the plate. A second slide 93 is similarly guided on the opposite sides of the racks 86 and 88, its projections 94 being contained within the slots 95. A pinion 100, substantially equal in length to the aggregate widths of the slides and intermediate rack, has its central portion constantly in mesh with the rack 86 and is provided with gudgeons 101 that are journaled within the brackets 102 secured to the plate 81 alongside the slides 90 and 93. A pinion 105, identical with the pinion 100, and having its gudgeons 106 journaled within the brackets 107, meshes with the rack 88. When the parts are in neutral condition, the racks repose with the pinions substantially central of them. The slide 90 is provided with comparatively short rack sections 90$^a$, 90$^b$, and 90$^c$. The slide 93 differs from the slide 90 in that it has an upper rail 109, and this slide is provided with the rack sections 93$^a$, 93$^b$, 93$^c$ and 93$^d$.

The forward end of each slide 90 and 93 is formed with an enlargement or head 110 that is slotted at 111 for the reception of a guide roller 112 that is carried by the plate 81. The outer edge of each head or enlargement is provided with a series of notches 113 into the respective ones of which a locator 114 is adapted to be moved by a spring 115, the locator being carried by the free end of an arm 116 which is pivoted at 117 to the plate 81. This arrangement is clearly for the purpose of holding the slides in their various positions and for indicating to the operator when such positions are reached. The adjacent edges of the heads or enlargements are provided with pockets, that of the slide 90 being designated 118, and the pocket of the slide 93, 119. A slide 120 is reciprocably connected to the plate 81 by screws or bolts 121 which rise from the plate 81 and occupy slots 122 in the slide and the slide is provided with a notch 123 which contains the portion of the flange 75 of the clutch member 70 with projections up through the slot 83 of the plate 81. A rack 124 is formed along one edge of the slide 120 and meshes with a segment 125 which constitutes a part of a shifter 126 journaled upon a post 127 that rises from the plate 81. The end of the shifter opposite the segment 125 is forked and overlies the central portion of the bottom rail of the slide 93. The slide 93 carries a pin 128 which is adapted to engage one side or the other of the fork of the shifter (according to the direction in which the slide is moved) and rotate the shifter upon the post 127 and accordingly move the slide 120 to shift the clutch member 70.

The open top of the casing is adapted to be closed by a cover 130 that is secured in place by cap screws 131. A shifting lever 135 may be supported by the cover so as to swing fore and aft as well as being capable of a sidewise movement, and the lower end of the lever extends down through an opening in the cover and occupies an H slot 138 in the plate 81.

When the end of the lever reposes within the cross of the H slot, in which position it is shown in Figs. 1 and 5, it effectually locks both slides 90 and 93 against movement. By shifting the end of the lever into the pocket 119 of the slide 93 and swinging it so as to move its lower end forwardly, the rack section 93$^b$ is moved into mesh with the pinion 100, rotating the pinion to the right (as viewed in Fig. 1) and causing the pinion to feed the rack 86 rearwardly, thus shifting the clutch member 11 in the same direction to engage its clutch face 13 with the clutch face that is formed on the forward end of the hub 51 of the bevel gear 30. The same movement will result in the rack section 93$^d$ moving under the pinion 105, rotating the pinion to the left with a consequential forward movement of the rack 88 and, through the intervention of the shifting collar 45, the clutch member 41 will be moved into engagement with the clutch face of the intermediate member of the planetary gear mechanism. With the parts in this condition the transmission of power from the driving shaft is as follows, it being understood that the various directions of rotations recited are as if the mechanism were viewed from the front. Assuming that the driving shaft is turning to the right (as indicated by the arrow in Fig. 1, and as is prevalent in automobile engines) the driving head 15, clutch member 11, and bevel gear 30 will be driven in the same direction. The bevel pinions 34 operating between the opposed bevel gears 30 and 31 will rotate the intermediate member 32 in the same direction, to-wit, to the right, and since the spur gears 36 and 37 are geared together through the pinions 68, 72, and 73 (it being remembered that the pinion 68 is locked to the shaft 67 through the clutch 70) it will be found, upon following the drive through the pinions 68, 72 and 73 (the pinions all being of the same diameter), that the spur gears 36 and 37 are driven at the same speed and in opposite directions. Consequently, the speed of the intermediate member of the differential gear mechanism is considerably less than that of the driving element. This intermediate member being coupled to the driven shaft through the clutch member 41, the driven shaft will be rotated to the right at what may be considered "low speed".

Upon moving the lower end of the shifting lever in the opposite direction, the slide 93 will be moved rearwardly, causing its rack section 93$^a$ to operate the pinion 100, and, as regards the pinion and the rack 86, with precisely the same result as before.

Also, the coöperation of the rack section 93ᶜ with the pinion 105 will result in this pinion being driven in the former direction and the coupling of the clutch member 41 with the intermediate member of the planetary gear mechanism.

In the present instance, however, the pin 128 of the slide 93 engages and swings the shifter 126 in a direction to move the slide 120 forwardly, uncoupling the clutch member 70 from the pinion 68 and through said clutch member locking the shaft 67 and consequently the pinion 72 in a stationary condition so that, through the intervention of the pinion 73, the spur gear 37 is held against rotation, and accordingly the intermediate member of the planetary gear mechanism will rotate at a much higher rate of speed than before and will result in the driven shaft being rotated at "second speed."

The parts may now be brought to their normal or neutral condition by swinging the shifting lever to its intermediate position where it may be shifted through the cross of the H slot into the pocket 118 of the slide 90. By swinging it to move its lower end forwardly, the slide 90 will be shifted in the same direction to bring its rack section 90ᵇ into mesh with the pinion 100. This will result in the pinion being rotated in a direction to feed the rack 86 forwardly to carry the clutch member 11 in the same direction to bring its clutch face 12 into engagement with the clutch face 21 of the clutch ring 20, that is secured, as above stated, to the driven element or sleeve 4. Thus, there is accomplished a direct connection between the driving and driven elements through the driving head 15 and clutch member 11, which represents "high speed."

We have now to consider the "reverse drive." This is accomplished by moving the slide 90 rearwardly to present its rack sections 90ᵃ and 90ᶜ to the respective pinions 100 and 105, rotating said pinions in a direction to feed the racks 86 and 88 rearwardly. As a consequence of this, the clutch member 11 is coupled with the bevel gear 30 and the clutch member 41 is engaged with the clutch face 43 of the bevel gear 31. With the parts in the present condition (it being remembered that the bevel gear 31 is driven in a reverse direction from that of the bevel gear 30 through the present condition of the mechanism comprising pinions 68, 72 and 73) the driven element will be rotated in a reverse direction to the driving element.

In truck or tractor work it is desirable to transmit the maximum power from the engine to the driven element even at the sacrifice of speed, and such may be accomplished through the modification of my invention illustrated in Fig. 7. Here a bevel gear 140 is fastened to the driving shaft 141 and constitutes one of the bevel gears of a planetary gear set similar to that above described in connection with the other form of my invention. A bevel gear opposed to that designated at 140 is represented by 142, and carries a spur gear 143 which is adapted to be coupled with the spur gear 144, carried by the intermediate member of the gear set, through mechanism designated generally 145, and corresponding precisely to that described in detail above as carried by the frame 66.

In the present instance a driving head 148 is formed as a part of the intermediate member of the differential gear set, and beyond this the present form is practically the same as the one above described. It will be seen from this that the driving head 148 may be driven at two different speeds relative to the driving shaft, the speeds being dependent upon the position of the clutch member included in the mechanism 145. When the clutch member of the mechanism 145 coöperates with the pinion meshing with the gear 144, the driving head will be rotated at its lower speed, and when the clutch member is coupled with the stationary clutch element, the spur gear 143 will be locked so that the speed of the intermediate member of the planetary gear set will be increased. The clutch member of the mechanism 145 may be actuated by any suitable means, such being indicated herein as consisting of a rock shaft 149, journaled in the side of the casing and having a shifting device 150 attached to it for coöperation with the flange of the clutch member.

Having thus described my invention, what I claim is:—

1. In mechanism of the character set forth, the combination of a driving and a driven element, a clutch member non-rotatable with respect to the driving element, a planetary gear set, one of the opposed members whereof is provided with a clutch face for engagement by one face of the clutch member, the second opposed member and the intermediate member of said set having opposed clutch faces, a second clutch member non-rotatable with respect to the driven element for coöperation with one or the other of the last mentioned clutch faces, means for shifting the clutch members, and further means through which certain rotating relations may be established between the second opposed and the intermediate members of the planetary gear set.

2. In mechanism of the character set forth, the combination of a driving element and a driven element, a clutch member non-rotatable with respect to the driving element, said clutch member having a clutch face at each end, a clutch element secured to the driven element and arranged to be engaged by one face of the clutch member, a planetary gear set having one of its opposed members provided with a clutch face arranged to be engaged by the other face of the clutch member while the second opposed member and the intermediate member of said set have opposed clutch faces, a double faced clutch member non-rotatable with respect to the driven element for engagement with either of the last mentioned clutch faces, means through which certain rotating relations may be established between the intermediate and second opposed members of the planetary gear set, and means for shifting the clutch members.

3. In mechanism of the character set forth, the combination of a driving and a driven element, a clutch member non-rotatable with respect to the driving element, a planetary gear set having one of its opposed members provided with a clutch face for engagement with the face of said clutch member, the intermediate and second opposed members of the planetary gear set having opposed clutch faces, means through which said members of the set may be caused to rotate at a given speed in opposite directions or by means of which the intermediate member may be freed while the other is locked against rotation, a clutch member non-rotatable with respect to the driven element for coöperation with the clutch face of either of said members, and means for shifting the clutch members.

4. In mechanism of the character set forth, the combination of a driving and a driven element, a clutch member non-rotatable with respect to the driving element, a planetary gear set one of whose opposed members has a clutch face for engagement by said clutch member, the intermediate and second opposed members of the set having each a spur gear, a clutch member through which either the intermediate or second opposed member may be coupled to the driven element, means for shifting the clutch members, a pinion constantly in mesh with the spur gear of the intermediate member, a second pinion rotatable upon the axis of the first pinion, a third pinion constantly meshing with the second pinion and with the spur gear of the second opposed member, and means through which the first and second pinions may be coupled together or the first freed and second locked against rotation.

5. In mechanism of the character set forth, the combination of a driving and a driven element, a clutch member non-rotatable with respect to the driving element, a planetary gear set one of whose opposed members has a clutch face for engagement by said clutch member, the intermediate and second opposed members of the set having each a spur gear, means for shifting the clutch member, a pinion constantly in mesh with the spur gear of the intermediate member, a second pinion rotatable upon the axis of the first pinion, a third pinion constantly meshing with the second pinion and with the spur gear of the second opposed member, and means through which the first and second pinions may be coupled together or the first freed and second locked against rotation.

6. In mechanism of the character set forth, the combination of a driving and a driven element arranged in axial alinement, a socketed driving head carried by the driving member and receiving the adjacent end of the driven element, a clutch ring secured to the driven element within the driving head, a clutch member slidable upon the driven element and having a sliding but non-rotating connection with the driving head, said clutch member having a clutch face at each end, a planetary gear set mounted upon the driven element adjacent the clutch member, one of the opposed members whereof is provided with a clutch face for engagement by the adjacent face of the clutch member, the second opposed member of said set and the intermediate member thereof having opposed clutch faces, a second clutch member slidable upon the driven element between said clutch faces, means for shifting the clutch members, and further means through which the second opposed and intermediate members of the planetary gear set are caused to rotate in opposite directions or through which one of said members may be locked against rotation.

7. In mechanism of the character set forth, the combination of a driving element and a driven element, a driving head carried by the driving element, a clutch member slidable upon the driven element and non-rotatable with respect to the driving head, said clutch member having a clutch face at each end, a clutch element secured to the driving element and arranged to be engaged by one face of the clutch member, a planetary gear set mounted upon the driven element and having one of its opposed members provided with a clutch face arranged to be engaged by the other face of the clutch member, the second opposed member and the intermediate member of the planetary gear set having opposed clutch faces, a double faced clutch member slidable upon the driven element for engagement with either of the last mentioned clutch faces, means through which the intermediate and second opposed members of the planetary gear set may be driven in opposite directions or through which said opposed member may be locked against rotation, and means for shifting the clutch members.

8. In mechanism of the character set forth, the combination of a driving and a driven element, a driving head carried by the driving element, a clutch element carried by the end of the driven element adjacent the driving element, a double faced clutch member slidable on the driven element for coöperation with said clutch element and being non-rotatable with respect to the driving head, a planetary gear set mounted on the driven element and having one of its opposed members provided with a clutch face for engagement with the adjacent face of the clutch member, the intermediate and second opposed members of the planetary gear set having opposed clutch faces, means through which said members of the set may be caused to rotate at a given speed in opposite directions or by means of which the intermediate member may be freed while the other is locked against rotation, a double faced clutch member slidable upon the driven element between the clutch faces of said members, and means for shifting the clutch members.

9. In mechanism of the character set forth, the combination of a driving and a driven element, a double faced clutch member slidable on the driven element and non-rotatable with respect to the driving element, a clutch element carried by the driven element and arranged to be engaged by one face of the clutch member, a planetary gear set mounted on the driven element and having one of its opposed members provided with a clutch face arranged to be engaged by the other face of the clutch member, a clutch member through which either the intermediate or second opposed member of the planetary gear set may be coupled with the driven member, means through which the last mentioned members of the planetary gear set may be caused to rotate at a given relative speed in opposite directions or through which the intermediate member may be freed while the other is locked against rotation, and means for shifting the clutch members.

10. In mechanism of the character set forth, the combination of a driving element and a driven element, a clutch member slidable upon the driven element and non-rotatable with respect to the driving element, means fixed with respect to the driven element and arranged to be engaged by the clutch member when the clutch member is moved in one direction thereby to couple the driving and driven elements together, a planetary gear set mounted on the driven element and having one of its opposed members provided with a clutch face arranged to be engaged by the clutch member when moved in the opposite direction, the hub of the intermediate member of said set having a clutch face, the second opposed member of the set having a sleeve hub spaced from the driven element and extending inward to said element at a point remote from the hub of the intermediate element, said inwardly extending portion having a clutch face opposed to the clutch face of the intermediate member, a double faced clutch member slidable upon the driven element between the last mentioned clutch faces, said clutch member having a circumferential groove, a shifting collar surrounding the sleeve hub, said hub having an opening, a member extending inwardly from said collar through the opening of the hub and having its inner end engaged within the groove of the clutch member, means for shifting said collar, means for shifting the first mentioned clutch member, and means through which certain rotating relations may be established between the intermediate and second opposed members of the set.

11. In mechanism of the character set forth, the combination of a driving and a driven element, the driven element having a shoulder, an abutment secured to the driven element and spaced from the shoulder, and a gear set mounted upon the driven element between the abutment and shoulder and through which the driving and driven elements may be coupled together at variable speeds, the abutment being adjustable to vary the distance between itself and the shoulder, as and for the purpose specified.

12. In mechanism of the character set forth, the combination of a driving and a driven element, the latter having a shoulder, an abutment member secured to the driven element and spaced from the shoulder, an adjusting ring carried by the abutment, and a gear set mounted upon the driven element between its shoulder and the adjusting ring and through which the driving and driven elements may be coupled together at variable speeds.

13. In mechanism of the character set forth, the combination of a driving and a driven element, the driven element having a shoulder, an abutment secured to the driven element and spaced from the shoulder, an adjusting ring screw threaded upon said abutment, and a gear set mounted upon the driven element between the adjusting ring and shoulder and through which the driving and driven elements may be coupled together at variable speeds.

14. In mechanism of the character set forth, the combination of a driving and a driven element, a train of gearing through which said elements may be coupled together at variable speeds, said gearing involving shiftable clutch members, and mechanism for incorporating an operating member through a single movement of which said mechanism may be caused to actuate a plurality of the clutch members in the attainment of a given gear ratio.

15. In mechanism of the character set forth, the combination of a driven and a driving element, transmission gearing through which power is transmitted from one to the other of said elements, clutches through which various relative speeds of the driving and driven elements are attained, a rack having operative connection with each of the clutches, pinions meshing with said racks, and slides having rack sections movable into and out of mesh with said pinions thereby to rotate the pinions and shift the racks in the actuation of said clutches.

16. In transmission gearing, the combination of a plurality of shiftable members, a rack having operative connection with each member, an elongated pinion meshing with each rack and extending beyond the side thereof, slides each having rack sections for coöperation with the end portions of certain of said pinions, and means for actuating the slides.

17. In transmission gearing, the combination of a plurality of shiftable members, racks having operative connection with certain of said members, means for shifting another of said members, a pinion meshing with each rack, slides having rack engaging sections for coöperation with said pinions, operative connections between one of said slides and the aforesaid means, and means for actuating the slides.

18. In transmission gearing, the combination of a plurality of shiftable members, a rack having operative connection with one of said members, a pinion meshing with said rack, a plate operatively connected to another of the aforesaid shiftable members, a slide having a rack section for coöperation with the pinion, a shifter pivotally supported adjacent the aforesaid plate and having operative connection therewith and with the aforesaid slide, and means for actuating the slide.

19. In transmission gearing, the combination of a plurality of shiftable members, racks having operative connection with certain of said members, a pinion meshing with each rack, a plate having a rack section and operatively connected to another of the aforesaid shiftable members, a slide having rack sections for coöperation with said pinions, a shifter pivotally supported adjacent the aforesaid plate and having a gear segment for coöperation with the rack section thereof, said shifter having a forked end overhanging the aforesaid slide, an abutment carried by the slide for engagement within the forked end of the shifter, and means for actuating the slide.

20. In mechanism of the character set forth, the combination of a driving shaft, a planetary gear set having one of its opposed members secured to said shaft, a driving head in fixed relation to the intermediate member of said gear set, transmission gearing arranged for driving connection with the driving head, and means through which certain rotating relations may be established between the second opposed member and the intermediate member of the planetary gear set.

In testimony whereof, I hereunto affix my signature in the presence of two witnesses.

AARON F. DICKEY.

Witnesses:
CLARENCE L. SHAVER,
DARYLE R. HECKMAN.